US012441329B1

(12) United States Patent
Giraldi

(10) Patent No.: US 12,441,329 B1
(45) Date of Patent: Oct. 14, 2025

(54) SYNCHRONOUS IN-VEHICLE COMMUNICATION

(71) Applicant: Zoox, Inc., Foster City, CA (US)

(72) Inventor: Riccardo Giraldi, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 814 days.

(21) Appl. No.: 17/531,588

(22) Filed: Nov. 19, 2021

(51) Int. Cl.
B60W 40/08 (2012.01)
B60R 11/02 (2006.01)
B60W 50/14 (2020.01)
H04R 5/02 (2006.01)
H04R 5/04 (2006.01)
H04W 4/48 (2018.01)

(52) U.S. Cl.
CPC ......... *B60W 40/08* (2013.01); *B60R 11/0217* (2013.01); *B60W 50/14* (2013.01); *H04R 5/02* (2013.01); *H04R 5/04* (2013.01); *H04W 4/48* (2018.02); *B60W 2040/0881* (2013.01); *B60W 2050/146* (2013.01); *H04R 2499/13* (2013.01)

(58) Field of Classification Search
None
See application file for complete search history.

(56) References Cited

U.S. PATENT DOCUMENTS

| 8,581,689 | B2 * | 11/2013 | Son .................. H04W 56/0025 340/4.2 |
| 9,451,122 | B2 | 9/2016 | De Rosa et al. |
| 10,368,199 | B2 | 7/2019 | van Os et al. |
| 10,457,179 | B1 * | 10/2019 | Kentley-Klay ........ B60N 2/879 |
| 10,636,309 | B2 * | 4/2020 | Lee .................. G08G 1/096791 |
| 11,144,539 | B2 | 10/2021 | Gambhir et al. |
| 2012/0303269 | A1 | 11/2012 | Kim et al. |
| 2014/0087654 | A1 | 3/2014 | Kiveisha et al. |
| 2014/0136100 | A1 | 5/2014 | Drysdale |
| 2015/0188988 | A1 | 7/2015 | Mei |
| 2016/0150036 | A1 | 5/2016 | De Rosa et al. |
| 2017/0361933 | A1 | 12/2017 | Van Der Klooster et al. |
| 2018/0267526 | A1 * | 9/2018 | Makke .................. B60R 16/037 |

(Continued)

OTHER PUBLICATIONS

Office Action for U.S. Appl. No. 17/531,611, mailed on Mar. 4, 2024, Girardi, "Enabling Asynchronous Shared Communication Between Passengers in Autonomous Vehicles", 15 Pages.

(Continued)

*Primary Examiner* — Donald J Wallace
*Assistant Examiner* — Mahmoud M Kazimi
(74) *Attorney, Agent, or Firm* — Lee & Hayes, P.C.

(57) ABSTRACT

Techniques for providing shared communication are discussed herein. A system can receive, at a server and from a first vehicle, a sharing request including a seating location of a first user in a first vehicle, an identity of a second user in a second vehicle, and content data. The system can transmit the sharing request to the second vehicle and receive data indicative an acceptance of the sharing request from the second vehicle. The system can further transmit, at least partially in response to receiving the data, a signal to the second vehicle to cause the second vehicle to output the content data via an in-vehicle device in a direction associated with a seat of the second vehicle, where the seat of the second vehicle is being determined based on the seating location of a first user in the first vehicle.

20 Claims, 6 Drawing Sheets

(56) References Cited

U.S. PATENT DOCUMENTS

| | | | |
|---|---|---|---|
| 2020/0092596 A1* | 3/2020 | Moore, Jr. | H04W 4/70 |
| 2020/0159481 A1* | 5/2020 | You | H04W 4/48 |
| 2020/0175284 A1 | 6/2020 | Viswanathan | |
| 2021/0326374 A1 | 10/2021 | Musallam | |
| 2023/0177272 A1 | 6/2023 | Stovezky et al. | |
| 2023/0353616 A1 | 11/2023 | Andon | |
| 2024/0028031 A1 | 1/2024 | Kentley-Klay et al. | |

OTHER PUBLICATIONS

Office Action for U.S. Appl. No. 17/531,611, mailed on Aug. 24, 2023, Riccardo Giraldi, "Asynchronous In-Vehicle Communication", 14 pages.

Office Action for U.S. Appl. No. 17/531,611, Date Aug. 29, 2024, 22 pages.

Office Action for U.S. Appl. No. 17/531,611, Dated Jan. 3, 2025, Giraldi, ":Enabling Asynchronous Shared Communication Between Passengers in Autonomous Vehicles," 24 pages.

\* cited by examiner

SYNCHRONOUS IN-VEHICLE COMMUNICATION

BACKGROUND

Autonomous vehicles may navigate along routes. For example, when the autonomous vehicles receive ride requests to travel to destination locations, the autonomous vehicles may navigate along routes from the current locations of the autonomous vehicles to a pickup location to pick up a passenger and/or from the pickup location to the destination locations. During a ride, groups of people traveling separately either in multiple vehicles at the same time or at disparate times may want to exchange information along the route.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
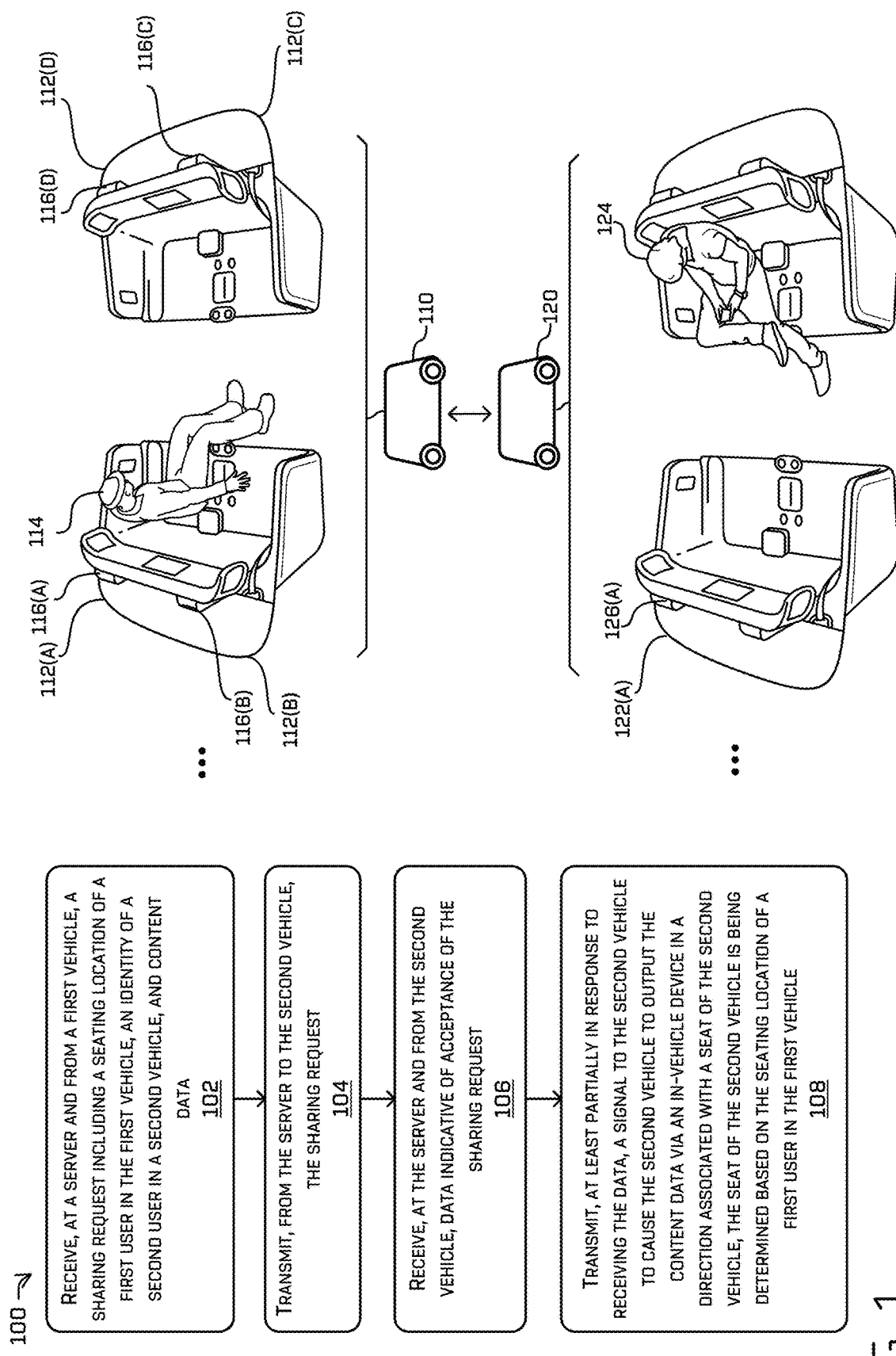
FIG. 1 is a pictorial flow diagram of an example process for providing shared communication.

Techniques described herein are directed to facilitating shared communication via one or more interior emitter(s) associated with a vehicle. Throughout the disclosure, shared communication may include facilitating communication between individuals located in multiple vehicles at substantially the same time (e.g., within technical tolerances) or providing shared communication from one or more persons from another set of persons upon a certain geolocation.

In some examples, a first passenger (or passengers) seated in a first vehicle can have shared communication (e.g., synchronous communication) with a second passenger (or passengers) seated in a second vehicle. As an example, a system can receive, at a server and from a first vehicle, a sharing request including a seating location of a first user in the first vehicle, an identity of a second user in a second vehicle, and content data. The system can transmit the sharing request from the server to the second vehicle and receive data indicative of acceptance of the sharing request from the second vehicle. The system can further transmit, at least partially in response to receiving the data, a signal to the second vehicle to cause the second vehicle to output the content data via an in-vehicle device in a direction associated with a seat of the second vehicle, where the seat of the second vehicle is being determined based on the seating location of a first user in the first vehicle. That is, techniques described herein can enable passengers in different vehicles to have immersive shared communication via respective in-vehicle devices.

In some examples, a passenger (or passengers) seated in a vehicle can have shared communication (e.g., asynchronous communication) with a person who is not seated in the same vehicle. As an example, a system can receive a request to activate a sharing mode and content data associated with the sharing mode at an autonomous vehicle. The system can determine a location in an environment based at least in part on the content data and determine a trajectory of the autonomous vehicle based at least in part on the location. The system can further determine whether the autonomous vehicle is within a threshold distance to the location. Based at least in part on the autonomous vehicle being within the threshold distance to the location, the system can output a first content determined based on the content data. Therefore, techniques described herein can enable a passenger in a vehicle to have an immersive shared communication with a person who is not seated in the same vehicle.

Consider, for example, a first scenario where two groups of people book two autonomous vehicles to travel to a destination (such as an airport). A first person in the first vehicle can initiate a shared communication with a second person in the second vehicle, such that passengers of the two vehicles can exchange audio and/or video from each vehicle, making it seem like the passengers are all riding together.

Consider, for example, a second scenario when a first passenger is taking an autonomous vehicle to a train station. As the passenger rides along in the vehicle, the passenger can capture audio and/or video data of them in the vehicle. The passenger can designate another user profile as the recipient of the message such that, when the recipient is in another autonomous vehicle (e.g., taking a separate ride to the train station at a different time), when the autonomous vehicle arrives at the location where the message was captured, the recipient can be presented with the content recorded by the first passenger.

Of course, the first and second scenarios above are merely illustrative and additional examples are provided throughout the disclosure.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein can be utilized in driver-controlled vehicles. In another example, the techniques can be utilized in an aviation or nautical context, or in any context involving the transportation of one or more passengers. That is, while techniques described herein are described with reference to autonomous vehicles, techniques described herein can be applied in additional or alternative contexts.

FIG. 1 is a pictorial flow diagram of an example process 100 for providing synchronized communication.

An operation 102 can include receiving, at a server and from a first vehicle, a sharing request (e.g., a request from a passenger to initiate communication with one or more individuals in one or more additional vehicles). An example of the first vehicle is illustrated as a first vehicle 110. In some examples, a first user 114 can provide the sharing request to the first vehicle 110 via an in-vehicle button associated with the first vehicle 110, a switch associated with the first vehicle 110, a touch screen associated with the first vehicle 110, an audio sensor associated with the first vehicle 110 (e.g., a voice command), or an image sensor associated with the first vehicle 110 (e.g., a gesture command). The server can receive the sharing request from the first vehicle 110. In some examples, the first user 114 can provide the sharing request using a remote computing device (e.g., a mobile device) and the first vehicle 110 can receive the sharing request and transmit the sharing request to the server.

In at least one example, the first vehicle 110 can be an autonomous vehicle configured to operate according to a Level 5 classification issued by the U.S. National Highway Traffic Safety Administration, which describes a vehicle capable of performing all safety-critical functions for an entire trip, with the driver (or occupant) not being expected to control the vehicle at any time. In such an example, since the first vehicle 110 can be configured to control all functions from start to stop, including all parking functions, it can be driverless. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the first vehicle 110 is an autonomous vehicle; however, the first vehicle 110 could be any other type of vehicle.

The first vehicle 110 can include a plurality of vehicle seats 112, which can be provided in any relative arrangement. The example first vehicle 110 can include an example carriage-style seating arrangement with four vehicle seats 112(A), 112(B), 112(C), and 112(D). However, it is contemplated that either end of the first vehicle 110 may include one, three, five, or more seats 112 adjacent to one another, and thus, the first vehicle 110 may be configured to provide seating for two, six, ten, or more passengers.

An operation 104 can include transmitting, from the server to the second vehicle 120, the sharing request. The system at the server can transmit the sharing request to initiate communication with one or more individuals in one or more additional vehicles, and the sharing request can include one or more seat location of one or more parties who initiates the communication in the first vehicle 110, one or more entity identifiers indicating one or more parties who are invited to join the communication, and content data. As an example, the sharing request can include a seating location of the first user 114 in the first vehicle 110, an entity identifier indicating the identity of the second user 124, and content data. Examples of entity identifier can include one or more of a number, a username, a full name, an email address, and/or other information that can be linked to the second user 124. In some examples, the first user 114 can provide the entity identifier indicating the identity of the second user 124 to the system at the server. The system at the server can determine a user account associated with the second user 124 and transmit the sharing request to a device or an autonomous vehicle (e.g., the second vehicle 120) associated with the user account associated with the second user 124.

In some examples, the seating location of the first user 114 in the first vehicle 110 can be determined based on data received from image sensor(s) and/or other sensor component(s) associated with the first vehicle 110. In at least one example, one or more of the seats 112(A)-112(D) can be associated with one or more sensor component(s) that can be used to determine an occupancy state associated with a seat.

In some examples, the sensor components can include pressure sensors and/or weight sensors. In some examples, the sensor component can provide weight and/or pressure data to the vehicle system of the first vehicle 110, and the vehicle system can use the weight and/or pressure data to determine whether a seat is occupied (e.g., whether the weight and/or the pressure data satisfies a threshold).

In some examples, the sensor components can include cameras or other vision systems, which can capture image(s) of the interior (and/or exterior) of the first vehicle 110. The vehicle system of the first vehicle 110 can analyze the image(s) to determine whether the first user 114 is located in a particular seat. The vehicle system of the first vehicle 110 can further determine, based at least in part on the first audio data and occupancy data received from the sensor components, that the first user 114 is located in the first seat 112(A) of the first vehicle 110.

In some examples, the sensor components can include seat interlock systems and the vehicle system of the first vehicle 110 can determine, based at least in part on data received from the seat interlock systems, that the first user 114 is located in the first seat 112(A) of the first vehicle 110. In some examples, the vehicle system of the first vehicle 110 can determine, based at least in part on mobile phone data, wireless signals, that the first user 114 is located in the first seat 112(A) of the first vehicle 110. In some examples, the vehicle system of the first vehicle 110 can determine, based at least in part on data received from a particular screen, that the first user 114 is interacting with the particular screen associated with the first seat 112(A) of the first vehicle 110.

In some examples, the content data can be received via one or more audio sensor(s) and/or image sensor(s) associated with the first vehicle 110. For example, the audio sensor can include a plurality of microphones 116, which may be provided in any relative arrangement. The example first vehicle 110 can include four microphones 116(A), 116(B), 116(C), and 116(D). However, it is contemplated that the first vehicle 110 can include two, six, eight, or more microphones 116 (or any number of microphones), and thus, the microphones 116 can be configured to capture first audio data associated with the first user 114 in a first vehicle seat of the first vehicle 110. As illustrated in FIG. 1, the first user 114 can be located in the vehicle seat 112(A), and the microphones 116 can be configured to capture first audio data associated with the first user 114 in the vehicle seat 112(A) of the first vehicle 110. In at least one example, one or more of the seats 112(A)-112(D) can be associated with one or more camera(s) or other image sensors that can be used to capture image data. The cameras or other image sensors can be disposed of at various locations about the interior of the first vehicle 110. The cameras or other image sensors can be configured to capture first image data associated with the first user 114 in the vehicle seat 112(A) of the first vehicle 110.

An operation 106 can include receiving, at the server and from the second vehicle 120, data indicative of acceptance of the sharing request. In some examples, the process 100 can include sending, from the server to the second vehicle 120, identity information indicating the identity of the second user 124. Examples of identify information received from the second vehicle 120 can include a user identifier indicating the second user 124, a vehicle number indicating the second vehicle 120, a QR code, a phone number associated with the second user 124, and etc. In some examples, the process 100 can include sending, from the server to the second vehicle 120, a pairing request. The second vehicle 120 can present the pairing request to the second user 124 through a mobile application. The second user 124 can accept the pairing request via the mobile application and transmit identity information indicating the identity of the second user 124 to the server.

An operation 108 can include transmitting, at least partially in response to receiving the data indicative of acceptance of the sharing request, a signal to the second vehicle 120 to cause the second vehicle 120 to output the content data via an in-vehicle device in a direction associated with a seat of the second vehicle, wherein the seat of the second vehicle 120 is being determined based on the seating location of the first user 114 in the first vehicle 110. As illustrated in FIG. 1, the second vehicle 120 can include a second seat 122(A) corresponding to the first seat 112(A) of the first vehicle 110. The output request can be configured to cause the first audio data to be output by one or more speakers 126(A) in a direction associated with the second seat 122(A) of the second vehicle 120. In at least one example, the process 100 can include transmitting the image data from the first vehicle 110 to the second vehicle 120, and the output request can further cause the image data to be projected by one or more projectors(s) in a direction associated with the second seat 122(A) of the second vehicle 120.

In at least one example, the process 100 can include receiving trip data associated with the first vehicle 110 and updating trip data associated with the second vehicle 120 based on the trip data associated with the first vehicle 110. Updating the trip data associated with the second vehicle 120 can cause a change to a route of the second vehicle 120. For example, the first user 114 and the second user 124 can be associated with different trips. For the purpose of this discussion, a "trip" can reference travel from an origin to a destination, which can be associated with global positioning system (GPS) coordinates or another geolocation associated with a map of an environment. In at least one example, the origin and the destination can be used by a vehicle system of the second vehicle 120 for determining instructions for controlling the vehicle 120 to travel from the origin to the destination. Updating the trip data associated with the second vehicle 120 based on the trip data associated with the first vehicle 110 can cause a change of the destination of the vehicle 120. As another example, the first user 114 and the second user 124 can be associated with the same trip. As described above, the vehicles 110 and 120 can be autonomous vehicles configured to determine routes and/or trajectories to use to control the respective vehicle based at least in part on sensor data received from respective sensor systems. That is, while the first user 114 and the second user 124 are associated with the same trip, the vehicles 110 and 120 can determine to take different routes and/or trajectories. Updating the trip data associated with the second vehicle 120 based on the trip data associated with the first vehicle 110 can cause a change of the route and/or trajectory of the second vehicle 120.

In at least one example, the process 100 can further include receiving audio data and first location data indicating a first location of the first vehicle from the first vehicle and determining that the audio data includes an audio cue (e.g., a wake word, an utterance, a voice command, etc.). In some examples, the audio cues may include direct verbal expressions such as "look!" or other audible expressions of note including excitement, pleasure, or other expressions conveyed via yelling, applause, cheering, or others. The system can further receive second location data indicating a second location of the second vehicle 120 and determine that the second vehicle 120 is within a threshold distance from the first location of the first vehicle 110 based on the first location data and the second location data. At least partially in response to determining the second vehicle 120 is within a threshold distance from the first location of the first vehicle 110, the system can transmit a second signal to the second vehicle to cause the second vehicle to output a visual indicator via an interior emitter associated with the second vehicle.

In some examples, the process 100 can include determining one or more buildings based at least in part on the location of the first vehicle 110 and map data associated with a map (e.g., of the map(s)), and presenting the buildings via a first display associated with the first seat 112(A) of the first vehicle 110. The second user 124 can provide an input indicating a building of the buildings via the first display and the building may be presented to the second user 124 via the first display. Upon receiving the input, the vehicle system of the first vehicle 110 may transmit information related to the building to the vehicle system of the second vehicle 120. The vehicle system of the second vehicle 120 may further project the building via the projectors associated with the second vehicle 120 when the second vehicle 120 is within a threshold distance from the location of the first vehicle. The projectors are located in the interior of the second vehicle 120. In some examples, the vehicle system of the second vehicle 120 may present the building to the second user 124 via a second display associated with the second vehicle 120.

Figure 2:
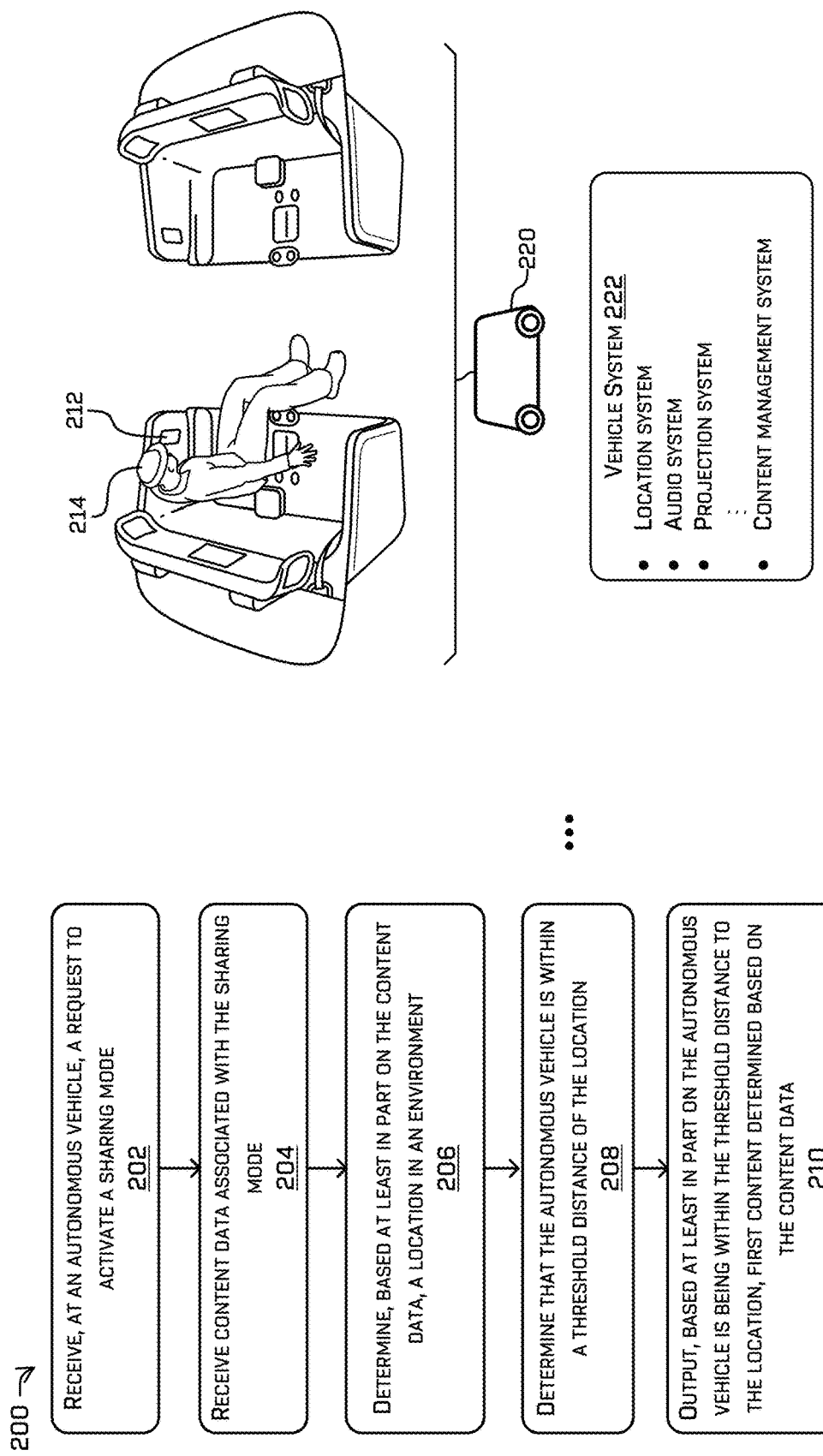
FIG. 2 is a pictorial flow diagram of another example process for providing shared communication.

FIG. 2 is a pictorial flow diagram of an example process 200 for providing asynchronized communication.

An operation 202 can include receiving, at an autonomous vehicle, a request to activate a sharing mode. An example vehicle is illustrated as a vehicle 220. In some examples, a passenger 214 can generate the request to activate the sharing mode via an in-vehicle button associated with the vehicle 220, a switch associated with the vehicle 220, a touch screen associated with the vehicle 220, an audio sensor associated with the vehicle 220 (e.g., a voice command), or an image sensor associated with the vehicle 220 (e.g., a gesture command). In some examples, the first user 114 can generate the request to activate the sharing mode using a remote computing device (e.g., a mobile device) and, the vehicle system 222 of the vehicle 220 can receive the sharing request. The vehicle system 222 can include various systems, such as a location system, audio system, projection system, content management system, and/or other systems. The location system can include location sensors (e.g., GPS, compass, etc.) that are configured to provide a location of the vehicle 220. The audio system can include one or more audio emitters (e.g., speakers, speaker arrays, horns, etc.) to audibly communicate with the passenger 214. The projection system can include one or more projector(s) to visually communicate with the passenger 214. In at least one example, the audio emitters and the projectors can be positioned at various locations about the interior of the vehicle 220.

An operation 204 can include receiving content data associated with the sharing mode. In some examples, the content data can include one or more contents associated with one or more locations. For example, a user can leave a geotagged message such as "Hey mom, I'm on my way to the hotel, make sure you check out this museum to our left we're passing right now. I want to show you this cool exhibit when you get to the hotel to meet me. Can't wait to see you!" In such examples, the content data can be designated to be output by a particular user profile (e.g., designated to be output by a user profile for the passenger 214). In some examples, the content data can include one or more contents for providing tour guiding information relating to one or more locations. For example, the content data can include a first audio content providing tour guiding information relating to a first location and a second audio content providing tour guiding information relating to a second location. In such examples, the content data can be publicly available to all user profiles. Examples of the one or more contents can include one or more audio clips, videos, images, augmented reality elements, etc.

In some examples, the content data can be captured by a second vehicle at the one or more locations. For example, the first audio content for providing tour guiding information relating to the first location can be captured by the second vehicle at the first location, and the second audio content for providing tour guiding information relating to the second location can be captured by the second vehicle at the second location. The second vehicle can transmit the content data to a remote computer storage system, and the first vehicle can receive the content data from the remote computer storage system and store the content data in a content management system.

An operation 206 can include determining, based at least in part on the content data, a location in an environment. For example, the vehicle system 222 of the vehicle 220 can determine, based at least in part on the content data and map data, the museum location and the hotel location in the environment. As another example, the vehicle system 222 of the vehicle 220 can determine, based at least in part on the content data and map data, the first location associated with the first audio content and the second location associated with the second audio content.

In some examples, the process 200 can include determining, based at least in part on the location in the environment, a trajectory of the vehicle 220. For example, the vehicle system 222 of the vehicle 220 can receive a current location of the vehicle 220 from the location system and determine a trajectory to the museum based on the current location of the vehicle 220 and the museum location in the environment. The vehicle system 222 of the vehicle 220 can further determine a trajectory to the hotel based on the current location of the vehicle 220 and the hotel location in the environment.

In some examples, the process 200 can include determining, based at least in part on the trajectory of the autonomous vehicle and map data, one or more locations along the trajectory, and receiving content data associated with the one or more locations. For example, the vehicle system 222 of the vehicle 220 can determining, based at least in part the trajectory to the hotel and map data one or more locations along the trajectory, and receiving content data associated with the one or more locations.

An operation 208 can include determining that the vehicle 220 is within a threshold distance (e.g., 5 feet, 10 feet, 15 feet, etc.) to the location in the environment. In some examples, the process 200 can include causing, in response to determining that the vehicle 220 is within the threshold distance to the location in the environment, a visual indicator associated with the content data to be output via an interior emitter associated with the vehicle. For example, the vehicle system 222 can cause the visual indicator to be output via light emitters located in the interior of the vehicle 220. As another example, the vehicle system 222 can cause the visual indicator to be output via the display 212. In some examples, the vehicle system 222 can transmit an output request to a device associated with the vehicle 220 and the output request can cause the visual indicator to be output via the device. In some examples, the vehicle system 222 can further output an audio indication via the audio emitters when the vehicle 220 is within the threshold distance from the location in the environment.

An operation 210 can include outputting, based at least in part on the vehicle 220 is being within the threshold distance to the location in the environment, a first content determined based on the content data. In some examples, the first content can be outputted via the audio emitters (e.g., speakers, speaker arrays, horns, etc.) to audibly communicate the first content to the passenger 214. In some examples, the first content can be outputted via one or more projectors or displays to visually communicate the first content to the passenger 214.

In some examples, the process 200 can further include determining, based at least in part on the content data, a second location in the environment, controlling the vehicle to travel to the second location, and outputting, based at least in part on the autonomous vehicle being within the threshold distance (e.g., 5 feet, 10 feet, 15 feet, etc.) to the second location, a second content determined based on the content data.

Figure 3A:
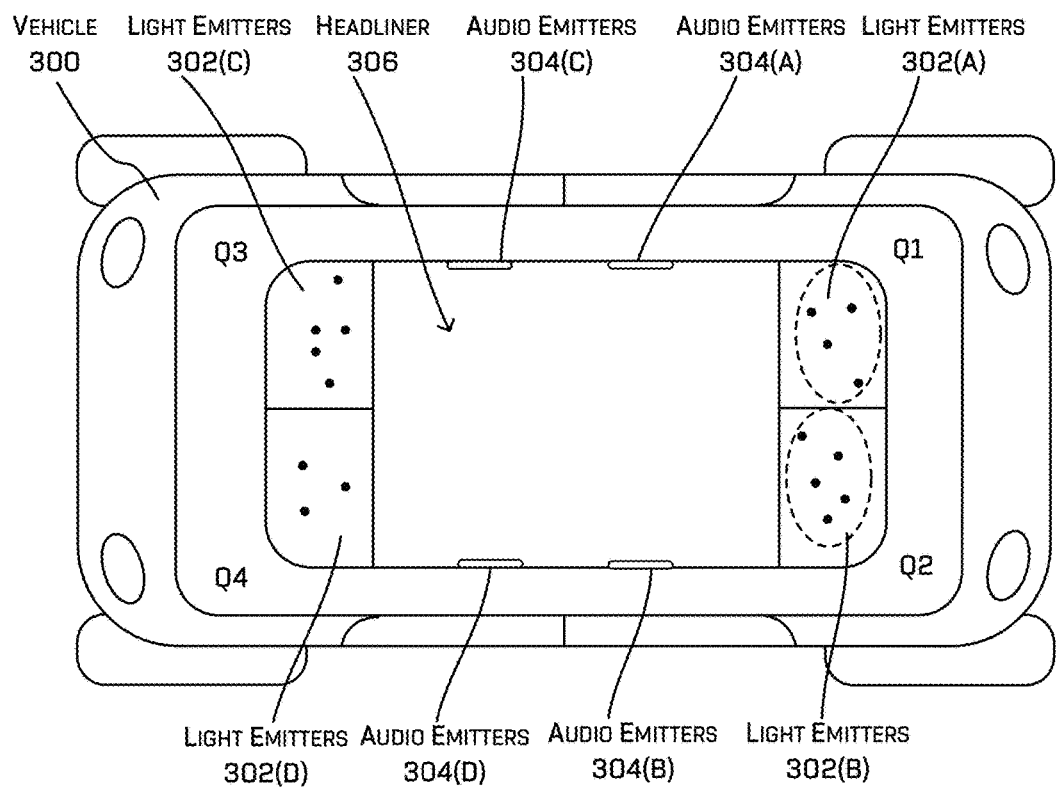
FIG. 3A is a top-down view of an example vehicle with cutaways to illustrate various interior emitters embedded in a vehicle headliner of the vehicle.

FIG. 3A is a top-down view of an example vehicle 300 with cutaways to illustrate various light emitters 302(A)-302(D) and audio emitters 304(A)-304D embedded in a vehicle headliner 306 of the vehicle. In other examples, the light emitters 302 may be located at locations of the vehicle headliner 306 other than what is indicated in FIG. 3A.

Portions of the vehicle 300 may be identified as quadrant portions Q1, Q2, Q3, and Q4, as illustrated in FIG. 3A. Thus, each of the vehicle seats 340(A) and 340(B) may be illuminated by respective light emitters 302(A) and 302(B) located in quadrant portions Q1 and Q2, and each of the vehicle seats 340(C) and 340(D) may be illuminated by respective light emitters 302(C) and 302(D) located in quadrant portions Q3 and Q4. The light emitters 302 may be configured to project video data to generate a virtual three-dimensional video.

The light emitters 302 need not be a semiconductor (e.g., Light Emitting Diode (LED)) source, and instead may be an arc-type lamp, a halogen-type lamp, a laser beam, and so on. In some examples, the light emitters 302 may include fiber optic cable. While light emitters are illustrated in FIG. 3A to have a particular shape, in other examples the light emitters 302 may have other shapes. For example, the light emitters 302 may be circular, square, symmetrical, a point source, an extended source, and so on. Moreover, the light emitters 302 need not actually produce a particular broad-spectrum light and instead may produce a light spectrum comprising one or more visible light bands having a resulting emitted light equivalent to any color temperature (e.g., including a relatively high amount of "yellow" light or "blue" light). As mentioned above, the light emitters 302 may be configured to have particular optical characteristics, such as brightness and angular distribution of brightness, which may be designed or determined based, at least in part, on one or more various standards or regulations.

In some examples, the light emitters 302 may include a processor being configured to implement a visual indication. For example, the processor of the light emitters 302 may receive control data that controls one or more of the light emitters 302 and implement the visual indication based on the control data. The control data may include, but is not limited to, data representing a selection of the one or more of the light emitters 302, data representing an activate signal being configured to activate the one or more of the emitters 302, data representing a selected color of the one or more of the light emitters 302, and/or data representing a light pattern of the one or more of the light emitters 302. As one example, the processor of the light emitters 302 may receive control data including a selection of the light emitters 302(A). The light emitters 302(A) may be configured to emit light based on the data representing an activate signal of light 302(A). The light emitters 302(A) may be further be configured to emit a selected color of light, such as green, based on data representing the selected color of the light emitters 303A. In some examples, each of the light emitters 302(A) may be individually controlled based on the data representing a light pattern. Therefore, based on the control data, the light emitters 302(A) located in quadrant Q1 may provide a visual indication to a user 350 seated in vehicle seat 340(A).

In some examples, the light emitters 302 may include projectors that are configured to project a three-dimensional (3D) content. For example, the processor of the light emitters 302 may receive control data that controls one or more of the light emitters 302 and project the 3D video based on the control data. The control data may include, but is not limited to, data representing a selection of the one or more of the light emitters 302, data representing an activate signal being configured to activate the one or more of the emitters 302, and/or data representing a 3D content. As one example, the processor of the light emitters 302 may receive control data including a selection of the light emitters 302(B). The light emitters 302(B) may be configured to project 3D content (e.g., 3D image, 3D video, etc.) to vehicle seat 340(B) to provide an immersive communication environment for a user 350 seated in vehicle seat 340(A).

In some examples, the vehicle 300 may further comprise various audio emitters 304 embedded in the vehicle headliner 306. In other examples, the audio emitters 304 may be located at locations of the vehicle headliner 306 other than what is indicated in FIG. 3A. Each of the vehicle seats 340(A) and 340(B) may be associated with audio emitters 304(A) and 304(B) located in quadrant portions Q1 and Q2, and each of the vehicle seats 340(C) and 340(D) may be associated with audio emitters 304(C) and 342(D) located in quadrant portions Q3 and Q4. The audio emitters 304 may be configured to audibly communicate with the user 350. In some examples, the audio emitters 304 may include a processor being configured to output audio based on control data. The control data may include, but is not limited to, data representing a selection of the one or more of the audio emitters 304, data representing an activate signal being configured to activate the one or more of the emitters 304, and/or audio data. As one example, the processor of the audio emitters 304 may receive control data including a selection of the light emitters 302(B). The light emitters 302(B) may be configured to output audio to provide an immersive communication environment for the user 350 seated in vehicle seat 340(A).

By using one or more interior emitters associated with the vehicle 300, the techniques described herein can facilitate communication between individuals located in multiple vehicles at substantially the same time (e.g., within technical tolerances) and/or provide shared communication from one or more persons from another set of persons upon certain geolocation.

Figure 3B:
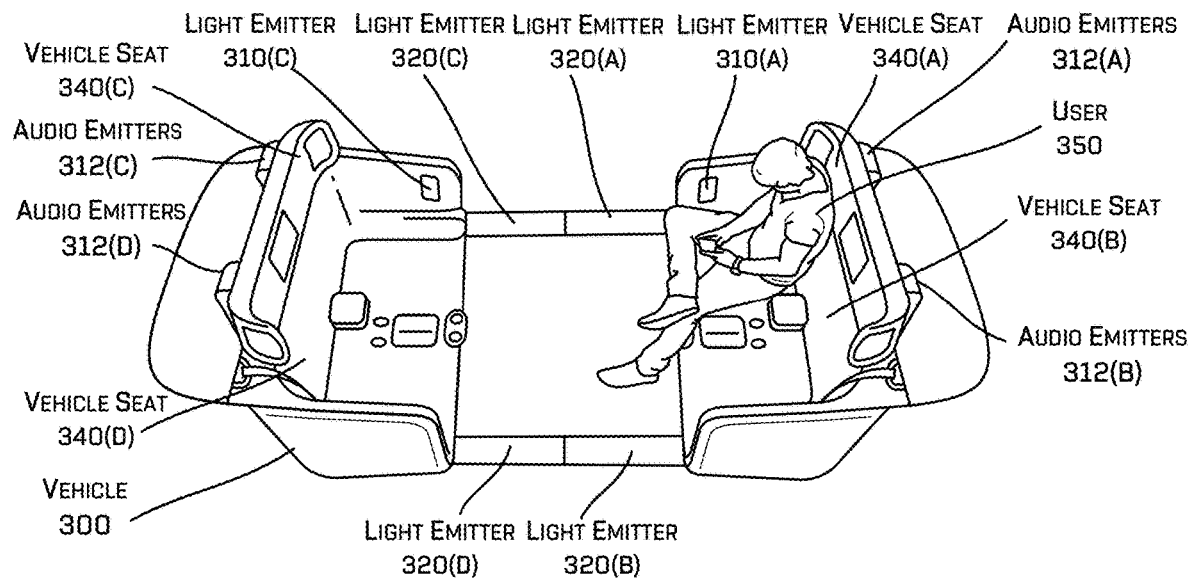
FIG. 3B is a perspective top view of an example vehicle with various interior emitters located in the vehicle.

FIG. 3B is a perspective top view of a vehicle 300 with various light emitters 310(A)-310(D) (light emitters 310(B) and 310(D) are not shown in FIG. 3B) embedded in respective sides of the vehicle 300 and various light emitters 320(A)-310(D) embedded in a floor of the vehicle 300. In some examples, the light emitters 310 and the light emitters 320 may be similar to or the same as the light emitters 302 discussed above with reference to FIG. 3A. The vehicle 300 further includes various audio emitters 312(A)-312(D) embedded in the vehicle 300. In some examples, the audio emitters 312 may be similar to or the same as the audio emitters 304 discussed above with reference to FIG. 3A.

In some examples, the light emitters 310 may include one or more user interface elements configured to output a visual indication to a user 350. The user interface element (e.g., the light emitter 310(A)) may be used by the user 350 of the vehicle seat 340(A) to turn off the visual indication. For example, the user 350 may use the user interface element to turn off one or more of the light emitters 310. In some examples, the vehicle 300 may further comprise various audio emitters embedded in the vehicle 300. The audio emitters may be configured to output audio to the user 350 seated in the vehicle seat 340(A).

Figure 4:
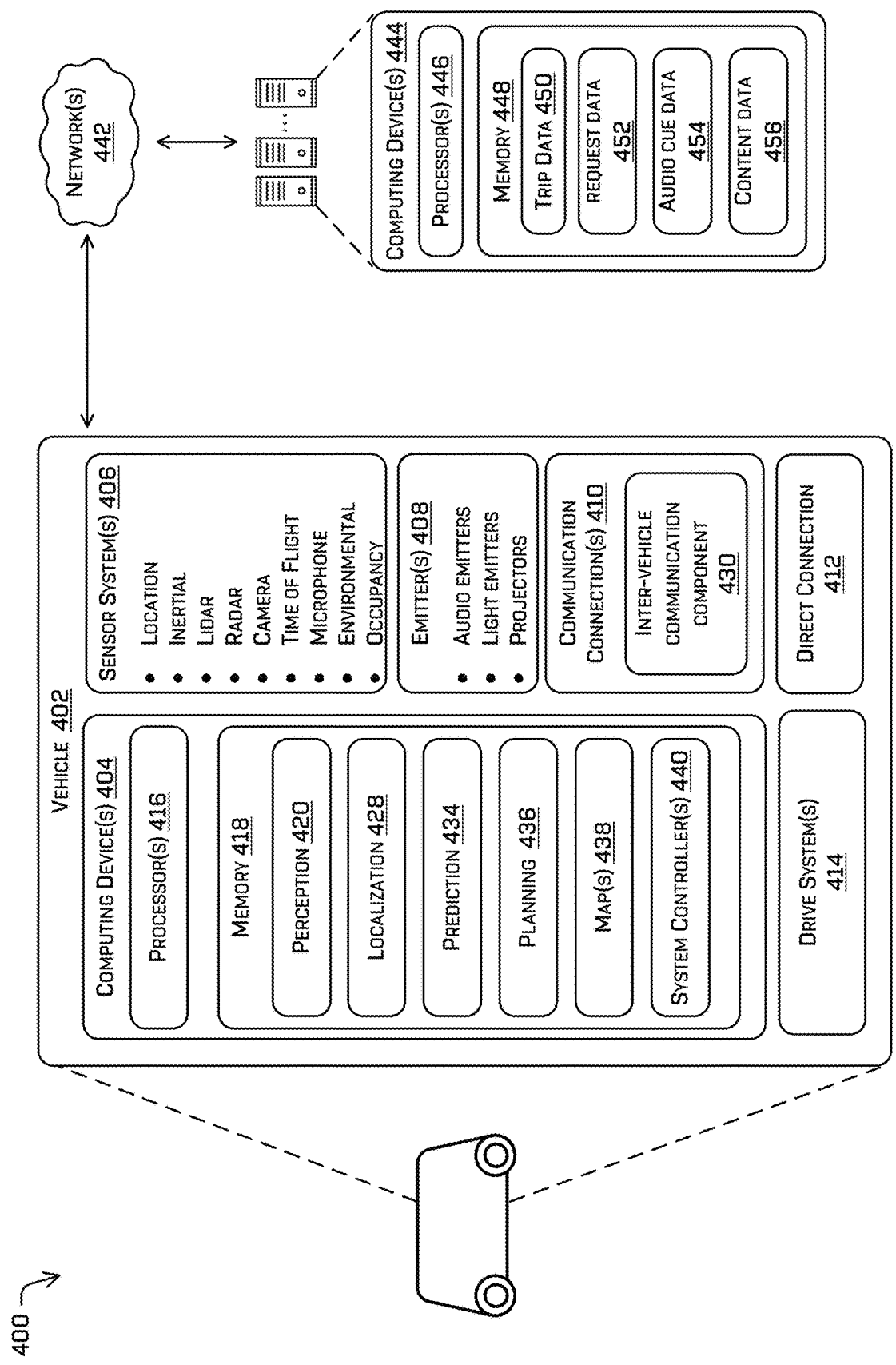
FIG. 4 depicts a block diagram of an example system for implementing the techniques described herein.

FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include audio and visual emitters and/or projectors to communicate with passengers of the vehicle 402. By way of example and not limitation, emitters can include speakers, lights, signs, display screens, touch screens, haptic emitters (e.g., vibration and/or force feedback), mechanical actuators (e.g., seatbelt tensioners, seat positioners, headrest positioners, etc.), and the like.

The vehicle 402 can also include one or more communication connection(s) 410 that enables communication between the vehicle 402 and one or more other local or remote computing device(s) (e.g., a remote teleoperation computing device) or remote services. For instance, the one or more communication connection(s) 410 can include an inter-vehicle communication component 430 configured to facilitate communication with other local computing device(s) on the vehicle 402 and/or the one or more drive system(s) 414. Also, the one or more communication connection(s)

410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short-range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and control the operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 428, a prediction component 434, a planning component 436, a maps component 438, and one or more system controller(s) 440. Though depicted as residing in the memory 418 for illustrative purposes, it is contemplated that the perception component 420, the localization component 428, the prediction component 434, the planning component 436, the maps component 438, and the one or more system controller(s) 440 can additionally, or alternatively, be accessible to the computing device 404 (e.g., stored in a different component of the vehicle 402) and/or be accessible to the vehicle 402 (e.g., stored remotely).

The perception component 420 can include functionality to perform object detection, segmentation, and/or classification. In some examples, the perception component 420 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to the motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 428 can include functionality to receive data from the sensor system(s) 406 and/or other components to determine a position of the vehicle 402. For example, the localization component 428 can include and/or request/receive a three-dimensional map of an environment and can continuously determine a location of the autonomous vehicle within the map. In some instances, the localization component 428 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 428 can provide data to various components of the vehicle 402 to determine an initial position of an autonomous vehicle for generating a trajectory, as discussed herein.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings the vehicle 402 to a safe stop avoiding all collisions and/or otherwise mitigating damage.

The memory 418 can further include one or more map(s) 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more map(s) 438 can include at least one map (e.g., images and/or a mesh). In some examples, the vehicle 402 can be controlled based at least in part on the map(s) 438. That is, the map(s) 438 can be used in connection with the perception component 420 (and sub-components), the localization component 428 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

The vehicle 402 can connect to computing device(s) 444 via network 442 and can include one or more processor(s) 446 and memory 448 communicatively coupled with the one or more processor(s) 446. In some examples, computing device(s) 444 can be associated with a server device. In at least one instance, the one or more processor(s) 446 can be similar to the processor(s) 416 and the memory 448 can be similar to the memory 418. In the illustrated example, the memory 448 of the computing device(s) 444 stores trip data 450, request data 452, audio cue data 454, and content data 456.

The trip data 450 can include pick up location data and drop off location data. In some examples, the trip data 450 may be provided by a user associated with the computing device(s) 444 via the user interface of the computing device(s) 444. For example, a user may provide pick up location and drop off location via the computing device(s) 444. The system controller(s) 440 may receive the trip data 450 and control the vehicle 402 based on the trip data.

The request data 456 can include a request to activate a sharing mode. In some examples, the request data 452 may be provided by a user associated with the computing device(s) 444 via the user interface of the computing device(s) 444. The system controller(s) 440 may receive the request data 456 and activate one or more emitter(s) 408 associated with the vehicle 402 based on the request data 456.

The audio cue data 454 can include example audio cues. Audio cues can include direct verbal expressions such as "look!" or other audible expressions of note including excitement, pleasure, or other expressions conveyed via yelling, applause, cheering, or others. The computing device(s) 404 may receive the audio cue data 454 and compare audio data received from emitter(s) 408 with the audio cue data 454 to determine whether the audio data received from emitter(s) 408 includes an audio cue.

Content data 456 can include one or more contents associated with one or more locations. For example, a user can leave a geotagged message such as "Hey mom, I'm on my way to the hotel, make sure you check out this museum to our left we're passing right now. I want to show you this cool exhibit when you get to the hotel to meet me. Can't wait to see you!" In such examples, the content data can be associated with a particular user profile (e.g., associated with a user profile for the passenger 214). In some examples, the content data can include one or more contents for providing tour guiding information relating to one or more locations. For example, the content data can include a first audio content providing tour guiding information relating to a first location and a second audio content providing tour guiding information relating to a second location. In such examples, the content data can be public to all user profiles. Examples of the one or more contents can include one or more of audio clips, videos, images, augmented reality elements, etc. The computing device(s) 404 may receive the content data 456 from the computing device(s) 444 and store the content data in memory 418.

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIGS. 1, 2, 5, and 6 illustrate example processes in accordance with examples of the disclosure. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

Figure 5:
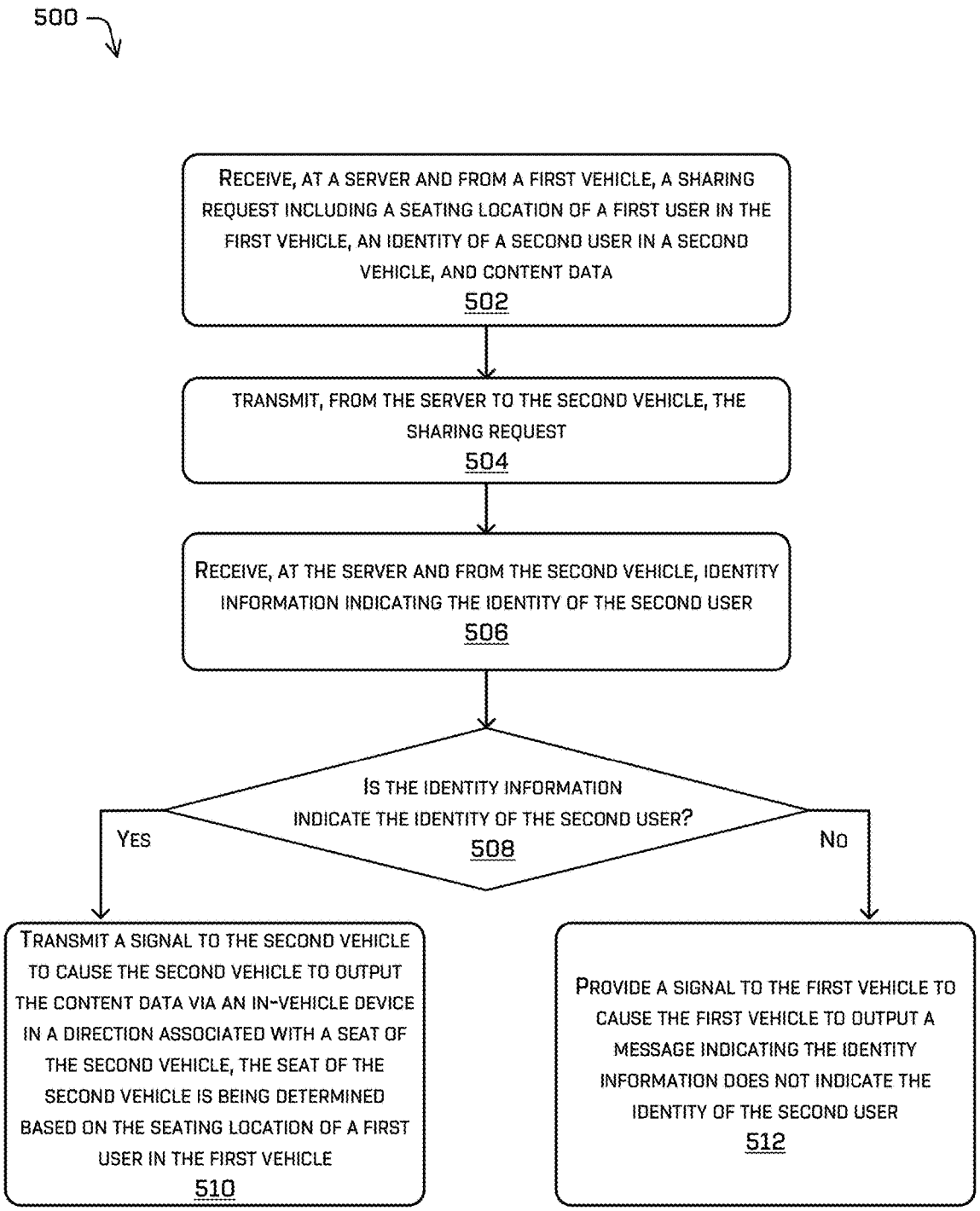
FIG. 5 is a flowchart illustrating an example process for providing shared communication.

FIG. 5 is an example process for providing shared communication. For example, some or all of the process 500 can be performed by one or more components in FIG. 4, as described herein. For example, some or all of the process 500 can be performed by the system controller(s) 440.

At operation 502, the process can include receiving, at a server and from a first vehicle, a sharing request including a seating location of a first user in the first vehicle, an identity of a second user in a second vehicle, and content data.

At operation 504, the process can include transmitting, from the server to the second vehicle, the sharing request.

At operation 506, the process can include receiving, at the server and from the second vehicle, identity information indicating the identity of the second user.

At operation 508, the process can include determining whether the identity information indicates the identity of the second user. If the identity information indicates the identity of the second user, operation 510 is executed. If the identity information does not indicate the identity of the second user, operation 512 is executed. In some examples, the operation 508 can include receiving data indicating an acceptance of the sharing request, a confirmation of the identity, and the like.

Figure 6:
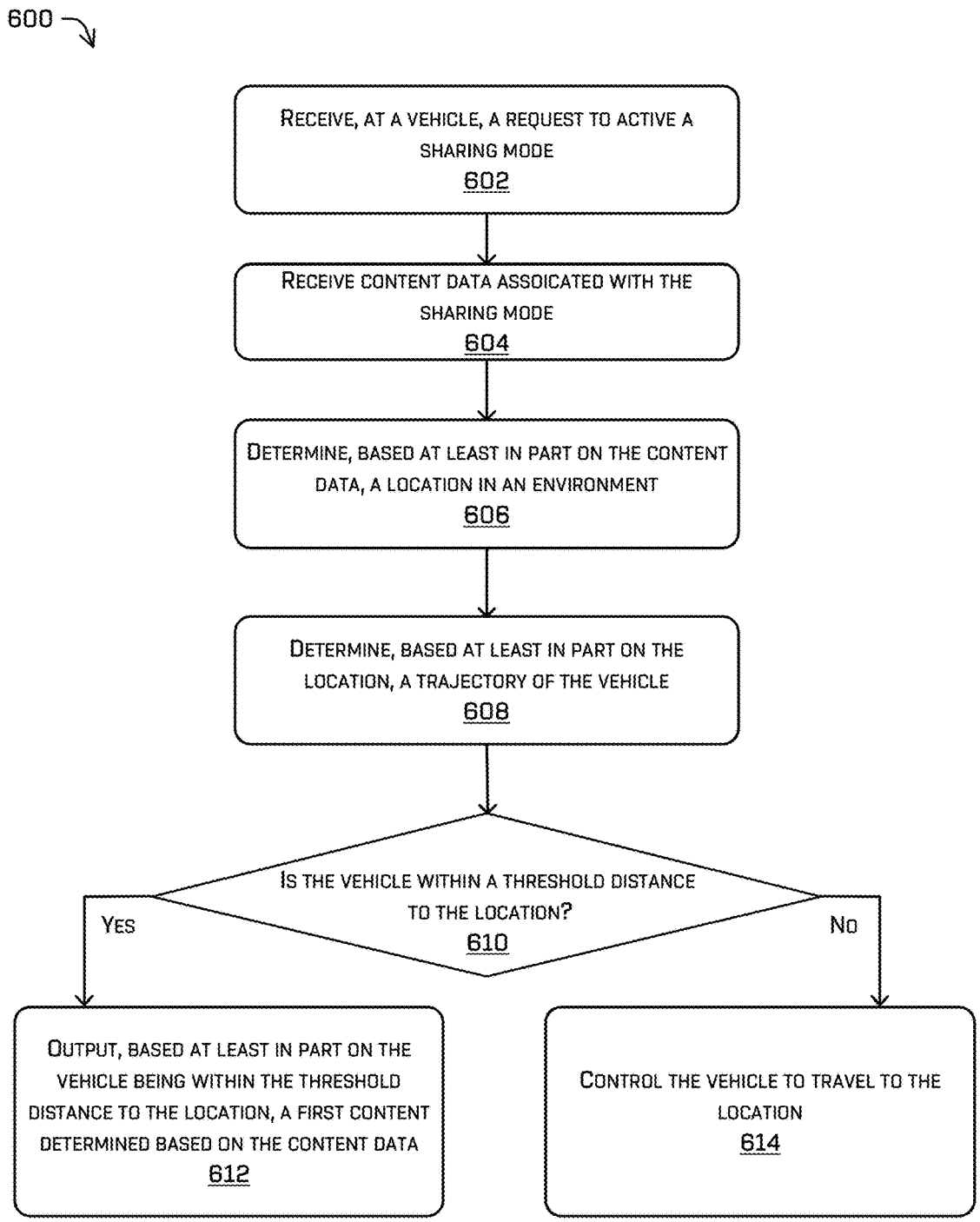
FIG. 6 is a flowchart illustrating another example process for providing shared communication.

At operation 510, the process can include transmitting a signal to the second vehicle to cause the second vehicle to output the content data via an in-vehicle device in a direction associated with a seat of the second vehicle, the seat of the second vehicle is being determined based on the seating location of a first user in the first vehicle At operation 512, the process can include providing a signal to the first vehicle to cause the first vehicle to output a message indicating the identity information does not indicate the identity of the second user FIG. 6 is an example process for providing shared communication. For example, some or all of the process 600 can be performed by one or more components in FIG. 4, as described herein. For example, some or all of the process 600 can be performed by the system controller(s) 440.

At operation 602, the process can include receiving, at a vehicle, a request to activate a sharing mode. For example, the operation 602 can include receiving an indication that a user wants to receive asynchronous content or shared content. In some examples, the indicate particular users that can provide shared content or can limit the number/type of shared content to be received.

At operation 604, the process can include receiving content data associated with the sharing mode. In some examples, the content data can include information indicative of conditions to be satisfied before the content is presented (e.g., location data, user identity information, sharing restrictions, etc.).

At operation 606, the process can include determining, based at least in part on the content data, a location in an environment. For example, the content data can specify a location and/or a threshold distance away from the location whereby, when the vehicle is at the location, the content is to be presented.

At operation 608, the process can include determining, based at least in part on the location, a trajectory of the vehicle. For example, the trajectory can cause the vehicle to traverse to the location.

At operation 610, the process can include determining whether the vehicle is within a threshold distance from the location. If the vehicle is within the threshold distance from the location, operation 612 is executed. If the vehicle is not within the threshold distance from the second location, operation 614 is executed.

At operation 612, the process can include outputting, based at least in part on the vehicle being within the threshold distance to the location, a first content determined based on the content data.

At operation 614, the process can include controlling the vehicle to travel to the location.

Example Clauses

A. A system comprising: one or more processors; and one or more non-transitory computer-readable media storing instructions executable by the one or more processors, wherein the instructions, when executed by the one or more processors, cause the one or more processors to perform operations comprising: receiving, at a server and from a first vehicle, a sharing request comprising a seating location of a first user in the first vehicle, an identity of a second user in a second vehicle, and content data; transmitting, from the server to the second vehicle, the sharing request; receiving, at the server and from the second vehicle, data indicative of acceptance of the sharing request; and transmitting, at least partially in response to receiving the data, a signal to the second vehicle to cause the second vehicle to output the content data via an in-vehicle device in a direction associated with a seat of the second vehicle, wherein the seat of the second vehicle is being determined based on the seating location of a first user in the first vehicle.

B. The system as paragraph A recites, wherein: the content data comprises audio data received from an audio sensor associated with the first vehicle; the in-vehicle device comprises a speaker in the direction associated with the seat of the second vehicle; and the signal is configured to cause the second vehicle to output the audio data via the speaker.

C. The system as paragraph A or B recites, wherein: the content data comprises image data received from an image sensor associated with the first vehicle; the in-vehicle device comprises a display in the direction associated with the seat of the second vehicle; and the signal is configured to cause the second vehicle to output the image data via the display.

D. The system as any of paragraphs A-C recites, wherein the sharing request is received via at least one of: an in-vehicle button associated with the first vehicle; a switch associated with the first vehicle; a touch screen associated with the first vehicle; an audio sensor associated with the first vehicle; an image sensor associated with the first vehicle; or another device associated with the first user.

E. The system as any of paragraphs A-D recites, the operations further comprising: receiving, at the server and from the first vehicle, occupancy data from an occupancy sensor associated with the first vehicle; determining, based at least in part on the occupancy data, the seating location of the first user in the first vehicle; and transmitting the occupancy data to the second vehicle for outputting the content data based at least in part on the occupancy data.

F. The system as any of paragraphs A-E recites, the operations further comprising: receiving, at the server and from the first vehicle, audio data and first location data indicating a first location of the first vehicle; determining, at the server, that the audio data includes an audio cue; receiving, at the server and from a second vehicle, second location data indicating a second location of the second vehicle; determining, based on the first location data and the second location data, that the second vehicle is within a threshold distance from the first location of the first vehicle; and transmitting, at least partially in response to determining the second vehicle is within a threshold distance from the first location of the first vehicle, a second signal to the second vehicle to cause the second vehicle to output a visual indicator via an interior emitter associated with the second vehicle.

G. One or more non-transitory computer-readable media storing instructions that, when executed by one or more processors, cause the one or more processors to perform operations comprising: receiving, at a server and from a first vehicle, a sharing request comprising a seating location of a first user in the first vehicle, an identity of a user profile, and content data; determining that the user profile is associated with a second vehicle; transmitting, from the server and to the second vehicle, the sharing request; receiving, at the server and from the second vehicle, a response to the sharing request; transmitting, based at least in part on the response, a signal to the second vehicle to cause the second vehicle to output the content data via an in-vehicle device in a direction associated with the user profile.

H. The one or more non-transitory computer-readable media as paragraph G recites, wherein: the content data comprises audio data received from an audio sensor associated with the first vehicle; the in-vehicle device comprises a speaker in the direction associated with the seat of the second vehicle; and the signal is configured to cause the second vehicle to output the audio data via the speaker.

I. The one or more non-transitory computer-readable media as paragraph F or H recites, wherein: the content data comprises image data received from an image sensor associated with the first vehicle; the in-vehicle device comprises a display associated with a seat occupied by the second user associated with the user profile; and the signal is configured to cause the second vehicle to output the image data via the display.

J. The one or more non-transitory computer-readable media as any of paragraphs F-I recites, wherein the sharing request is received via at least one of: an in-vehicle button associated with the first vehicle; a switch associated with the first vehicle; a touch screen associated with the first vehicle; an audio sensor associated with the first vehicle; an image sensor associated with the first vehicle; or another device associated with the first user.

K. The one or more non-transitory computer-readable media as any of paragraphs F-J recites, the operations further comprising: receiving, at the server and from a first vehicle, occupancy data from an occupancy sensor associated with the first vehicle; determining, based at least in part on the occupancy data, the seating location of the first user in the first vehicle; and transmitting the occupancy data to the second vehicle for outputting the content data based at least in part on the occupancy data.

L. The one or more non-transitory computer-readable media as any of paragraphs F-K recites, the operations further comprising: receiving, at the server and from the first vehicle, audio data and first location data indicating a first location of the first vehicle; determining, at the server, that the audio data includes an audio cue; receiving, at the server and from a second vehicle, second location data indicating a second location of the second vehicle; determining, based on the first location data and the second location data, that the second vehicle is within a threshold distance from the first location of the first vehicle; and transmitting, at least partially in response to determining the second vehicle is within a threshold distance from the first location of the first vehicle, a second signal to the second vehicle to cause the second vehicle to output a visual indicator via an interior emitter associated with the second vehicle.

M. The one or more non-transitory computer-readable media as any of paragraphs F-L recites, the operations further comprising: transmitting, in response to receiving the sharing request and based on a first route associated with the first vehicle, updated route information to the second vehicle to cause the second vehicle to alter a second route associated with the second vehicle.

N. A method comprising: receiving, at a server and from a first vehicle, a sharing request comprising a seating location of a first user in the first vehicle, an identity of a second user in a second vehicle, and content data; transmitting, from the server to the second vehicle, the sharing request; receiving, at the server and from the second vehicle, information indicating the identity of the second user; transmitting, at least partially in response to receiving the information indicating the identity of the second user, a signal to the second vehicle to cause the second vehicle to output the content data via an in-vehicle device in a direction associated with a seat of the second vehicle, wherein the seat of the second vehicle is being determined based on the seating location of a first user in the first vehicle.

O. The method as paragraph N recites, wherein: the content data comprises audio data received from an audio sensor associated with the first vehicle; the in-vehicle device comprises a speaker in the direction associated with the seat of the second vehicle; and the signal is configured to cause the second vehicle to output the audio data via the speaker.

P. The method as paragraph N or O recites, wherein the content data comprises image data received from an image sensor associated with the first vehicle; the in-vehicle device comprises a display in the direction associated with the seat of the second vehicle; and the signal is configured to cause the second vehicle to output the image data via the display.

Q. The method as any of paragraphs N-P recites, wherein the sharing request is received via at least one of: an in-vehicle button associated with the first vehicle; a switch associated with the first vehicle; a touch screen associated with the first vehicle; an audio sensor associated with the first vehicle; an image sensor associated with the first vehicle; or another device associated with the first user.

R. The method as any of paragraphs N-Q recites, further comprising: receiving, at the server and from a first vehicle, occupancy data from an occupancy sensor associated with the first vehicle; determining, based at least in part on the occupancy data, the seating location of the first user in the first vehicle; and transmitting the occupancy data to the second vehicle for outputting the content data based at least in part on the occupancy data.

S. The method as any of paragraphs N-R recites, further comprising: receiving, at the server and from the first vehicle, audio data and first location data indicating a first location of the first vehicle; determining, at the server, that the audio data includes an audio cue; receiving, at the server and from a second vehicle, second location data indicating a second location of the second vehicle; determining, based on the first location data and the second location data, that the second vehicle is within a threshold distance from the first location of the first vehicle; and transmitting, at least partially in response to determining the second vehicle is within a threshold distance from the first location of the first vehicle, a second signal to the second vehicle to cause the second vehicle to output a visual indicator via an interior emitter associated with the second vehicle.

T. The method as any of paragraphs N-S recites, further comprising: transmitting, in response to receiving the sharing request and based on a first route associated with the first vehicle, updated route information to the second vehicle to cause the second vehicle to alter a second route associated with the second vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed by the one or more processors, cause the one or more processors to perform operations comprising:
receiving, from an image sensor disposed on a first vehicle, image sensor data representing an environment external to the first vehicle;
generating a trajectory based in part on the image sensor data;
controlling the first vehicle based in part on the trajectory;
outputting at least a portion of the image sensor data via a first display associated with a first seating location of a first user in the first vehicle;
receiving, at the first vehicle, a sharing request comprising first data indicating the first seating location of the first user in the first vehicle and an entity identifier indicating an identity of a second user in a second vehicle;
transmitting, to the second vehicle, the sharing request;
receiving, from the second vehicle, second data indicative of the second user in the second vehicle accepting the sharing request;
generating content data comprising at least the portion of the image sensor data of the environment external to the first vehicle; and
transmitting, based at least in part on generating the content data, a signal to the second vehicle to cause the second vehicle to output the content data via a second display associated with a second seating location of the second user, wherein the second seating location of the second user in the second vehicle is being determined based at least in part on the first seating location of the first user in the first vehicle.

2. The system of claim 1, wherein:
the content data comprises audio data received from an audio sensor associated with the first vehicle; and
the signal is configured to cause the second vehicle to output the audio data via a speaker disposed in the second vehicle and in a direction associated with the second seating location.

3. The system of claim 1, wherein the sharing request is received via at least one of:
an in-vehicle button associated with the first vehicle;
a switch associated with the first vehicle;
a touch screen associated with the first vehicle;
an audio sensor associated with the first vehicle;
or
another device associated with the first user.

4. The system of claim 1, the operations further comprising:
receiving, at the first vehicle, occupancy data from an occupancy sensor associated with the first vehicle;
determining, based at least in part on the occupancy data, the first seating location of the first user in the first vehicle; and
transmitting the occupancy data to the second vehicle for outputting the content data based at least in part on the occupancy data.

5. The system of claim 1, the operations further comprising:
receiving, at the first vehicle, audio data and first location data indicating a first location of the first vehicle;
determining that the audio data includes an audio cue;
receiving, from the second vehicle, second location data indicating a second location of the second vehicle;
determining, based on the first location data and the second location data, that the second vehicle is within a threshold distance from the first location of the first vehicle; and
transmitting, at least partially in response to determining that the second vehicle is within the threshold distance from the first location of the first vehicle, a second signal to the second vehicle to cause the second vehicle to output a visual indicator via an interior emitter associated with the second vehicle.

6. The system of claim 1, wherein the portion of the image sensor data output via the first display comprises an image of a building in the environment external to the first vehicle.

7. The system of claim 1, wherein the first vehicle further comprises:
a first audio emitter and a first light emitter associated with the first seating location;
a second audio emitter and a second light emitter associated with a third seating location;
a third audio emitter and a third light emitter associated with a fourth seating location; and
a fourth audio emitter and a fourth light emitter associated with a fifth seating location.

8. The system of claim 1, wherein the signal to the second vehicle further causes the second vehicle to output the content data via the second display in response to determining that the second vehicle is within a threshold distance to a location in the environment associated with the image sensor data.

9. One or more non-transitory computer-readable media storing instructions that, when executed by one or more processors, cause the one or more processors to perform operations comprising:
receiving, from an image sensor disposed on a first vehicle, image sensor data representing an environment external to the first vehicle;
generating a trajectory based in part on the image sensor data;
controlling the first vehicle based in part on the trajectory;
outputting at least a portion of the image sensor data via a first display associated with a first seating location of a first user in the first vehicle;
receiving, at the first vehicle, a sharing request comprising first data indicating the first seating location of the first user in the first vehicle and an entity identifier indicating an identity of a user profile;
determining that the user profile is associated with a second user in a second vehicle;
transmitting, to the second vehicle, the sharing request;
receiving, from the second vehicle, second data indicative of the second user in the second vehicle accepting the sharing request;
generating content data comprising at least the portion of the image sensor data of the environment external to the first vehicle; and
transmitting, based at least in part on generating the content data, a signal to the second vehicle to cause the second vehicle to output the content data via a second display associated with a second seating location of the second user in the second vehicle.

10. The one or more non-transitory computer-readable media of claim 9, wherein:
the content data comprises audio data received from an audio sensor associated with the first vehicle; and
the signal is configured to cause the second vehicle to output the audio data via a speaker disposed in the second vehicle and in a direction associated with the second seating location.

11. The one or more non-transitory computer-readable media of claim 9, wherein the sharing request is received via at least one of:
an in-vehicle button associated with the first vehicle;
a switch associated with the first vehicle;
a touch screen associated with the first vehicle;
an audio sensor associated with the first vehicle; or
another device associated with the first user.

12. The one or more non-transitory computer-readable media of claim 9, the operations further comprising:
receiving, at the first vehicle, occupancy data from an occupancy sensor associated with the first vehicle;
determining, based at least in part on the occupancy data, the first seating location of the first user in the first vehicle; and
transmitting the occupancy data to the second vehicle for outputting the content data based at least in part on the occupancy data.

13. The one or more non-transitory computer-readable media of claim 9, the operations further comprising:
receiving, the first vehicle, audio data and first location data indicating a first location of the first vehicle;
determining that the audio data includes an audio cue;
receiving, from the second vehicle, second location data indicating a second location of the second vehicle;
determining, based on the first location data and the second location data, that the second vehicle is within a threshold distance from the first location of the first vehicle; and
transmitting, at least partially in response to determining that the second vehicle is within the threshold distance from the first location of the first vehicle, a second signal to the second vehicle to cause the second vehicle to output a visual indicator via an interior emitter associated with the second vehicle.

14. The one or more non-transitory computer-readable media of claim 9, the operations further comprising:
transmitting, in response to receiving the sharing request and based on a first route associated with the first vehicle, updated route information to the second vehicle to cause the second vehicle to alter a second route associated with the second vehicle.

15. A method comprising:
receiving, from an image sensor disposed on a first vehicle, image sensor data representing an environment external to the first vehicle;

generating a trajectory based in part on the image sensor data;
controlling the first vehicle based in part on the trajectory;
outputting at least a portion of the image sensor data via a first display associated with a first seating location of a first user in the first vehicle;
receiving, at the first vehicle, a sharing request comprising the first seating location of the first user in the first vehicle and an entity identifier indicating an identity of a second user in a second vehicle;
transmitting, to the second vehicle, the sharing request;
receiving, from the second vehicle, information indicating the identity of the second user, a second seating location of the second user in the second vehicle, and data indicating that the second user in the second vehicle accepted the sharing request;
generating content data comprising at least the portion of the image sensor data of the environment external to the first vehicle; and
transmitting, at least partially in response to generating the content data, a signal to the second vehicle to cause the second vehicle to output the content data via a second display associated with the second seating location of the second user in the second vehicle, wherein the second seating location is being determined based at least in part on the first seating location of the first user in the first vehicle.

16. The method of claim 15, wherein:
the content data comprises audio data received from an audio sensor associated with the first vehicle; and
the signal is configured to cause the second vehicle to output the audio data via a speaker disposed in the second vehicle and in a direction associated with the second seating location.

17. The method of claim 15, wherein the sharing request is received via at least one of:
an in-vehicle button associated with the first vehicle;
a switch associated with the first vehicle;
a touch screen associated with the first vehicle;
an audio sensor associated with the first vehicle;
or
another device associated with the first user.

18. The method of claim 15, further comprising:
receiving, at the first vehicle, occupancy data from an occupancy sensor associated with the first vehicle;
determining, based at least in part on the occupancy data, the first seating location of the first user in the first vehicle; and
transmitting the occupancy data to the second vehicle for outputting the content data based at least in part on the occupancy data.

19. The method of claim 15, further comprising:
receiving, at the first vehicle, audio data and first location data indicating a first location of the first vehicle;
determining that the audio data includes an audio cue;
receiving, from the second vehicle, second location data indicating a second location of the second vehicle;
determining, based on the first location data and the second location data, that the second vehicle is within a threshold distance from the first location of the first vehicle; and
transmitting, at least partially in response to determining that the second vehicle is within the threshold distance from the first location of the first vehicle, a second signal to the second vehicle to cause the second vehicle to output a visual indicator via an interior emitter associated with the second vehicle.

20. The method of claim 15, further comprising:
transmitting, in response to receiving the sharing request and based on a first route associated with the first vehicle, updated route information to the second vehicle to cause the second vehicle to alter a second route associated with the second vehicle.

* * * * *